US012720349B2

(12) United States Patent
Fan

(10) Patent No.: US 12,720,349 B2
(45) Date of Patent: Aug. 25, 2026

(54) MEASUREMENT METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 452 days.

(21) Appl. No.: 18/201,239

(22) Filed: May 24, 2023

(65) Prior Publication Data

US 2023/0308924 A1 Sep. 28, 2023

Related U.S. Application Data

(63) Continuation of application No. PCT/CN2021/075857, filed on Feb. 7, 2021.

(51) Int. Cl.
*H04W 24/10* (2009.01)
*H04B 17/318* (2015.01)
*H04B 17/345* (2015.01)

(52) U.S. Cl.
CPC .......... *H04W 24/10* (2013.01); *H04B 17/328* (2023.05); *H04B 17/345* (2015.01)

(58) Field of Classification Search
CPC .... H04W 24/10; H04B 17/345; H04B 17/328
See application file for complete search history.

(56) References Cited

U.S. PATENT DOCUMENTS 11,877,172 B2 * 1/2024 Lee ........................ H04W 80/02
2021/0235344 A1 * 7/2021 Jung ..................... H04W 36/32
2022/0014943 A1 * 1/2022 Zhang ............... H04W 36/0085

FOREIGN PATENT DOCUMENTS

CN 111278028 A 6/2020
CN 111615119 A 9/2020
CN 111757349 A 10/2020
CN 111787563 A 10/2020
CN 111800800 A 10/2020
EP 3905758 A1 11/2021
EP 3952418 A1 2/2022
EP 4017069 A1 6/2022
WO 2010110705 A1 9/2010
WO 2014059672 A1 4/2014
WO 2020089388 A1 5/2020
WO 2020132832 A1 7/2020
(Continued)

OTHER PUBLICATIONS

International Search Report and Written Opinion dated Oct. 28, 2021 in International Application No. PCT/CN2021/075857. English translation attached.

(Continued)

*Primary Examiner* — Duc C Ho
(74) *Attorney, Agent, or Firm* — Sheppard, Mullin, Richter & Hampton LLP

(57) ABSTRACT

The present disclosure provides a measurement method, a terminal device, and a network device. The method includes: relaxing, by a terminal device, a radio frequency measurement criterion and/or restricting, by the terminal device, cell measurement report content under a condition.

12 Claims, 4 Drawing Sheets

(56) References Cited

FOREIGN PATENT DOCUMENTS

WO 2020204463 A1 10/2020

OTHER PUBLICATIONS

"3rd Generation Partnership Project; Technical Specification Group Radio Access Network; NR; Radio Resource Control (RRC) protocol specification (Release 16)", 3GPP TS 38.331V16.3.1, Jan. 7, 2021.

"3rd Generation Partnership Project; Technical Specification Group Radio Access Network; NR; Requirements for support of radio resource management (Release 17)", 3GPP TS 38.133 V17.0.0, Dec. 2020.

Extended European Search Report dated Oct. 27, 2023 received in European Patent Application No. EP21923821.9.

Huawei et al:Discussion on RRC_IDLE mode issues in NTNu 3GPP Draft; R2-2009637, 3rd Generation Partnership Project (3GPP), Mobile Competence Centre ; 650, Route Des Lucioles ; F-06921 Sophia-Antipolis Cedex) France vol. RAN WG2, No. Online; Nov. 2, 2020-Nov. 13, 2020, Oct. 23, 2020 (Oct. 23, 2020), XP052362686.

* cited by examiner

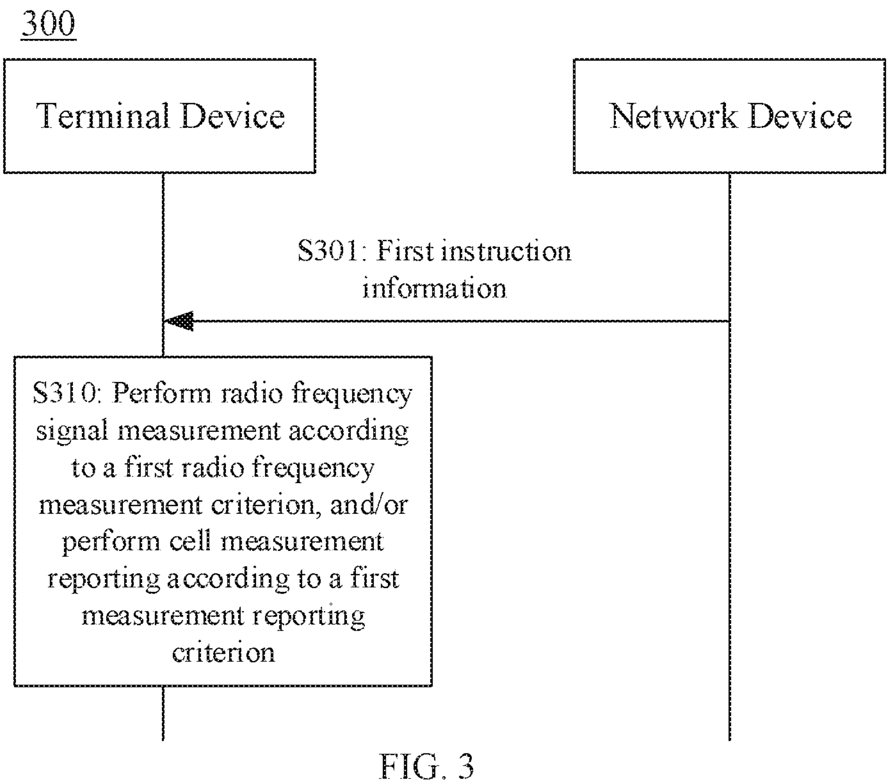
FIG. 3
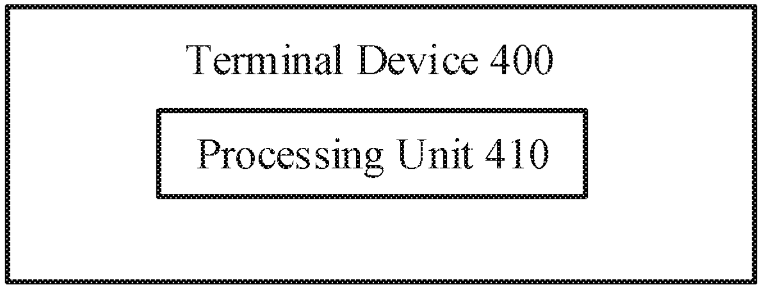
FIG. 4
Terminal Device 500
Processing Unit 510
FIG. 5

MEASUREMENT METHOD, TERMINAL DEVICE, AND NETWORK DEVICE

CROSS-REFERENCE TO RELATED APPLICATIONS

This application is a continuation of International Application No. PCT/CN2021/075857 filed on Feb. 7, 2021, the entire disclosure of which is incorporated herein by reference.

TECHNICAL FIELD

The embodiments of the present disclosure relate to communication technology, and more particularly, to a measurement method, a terminal device, and a network device.

BACKGROUND

A terminal device needs to measure a radio frequency signal based on a radio frequency measurement criterion, which specifies measurement requirements such as a requirement on a minimum number of times the terminal device samples a radio frequency signal, and a requirement on a minimum sampling time interval between consecutive sampling processes of any radio frequency signal performed by the terminal device. In addition, the terminal device needs to perform measurements based on requirements of a measurement configuration and report corresponding measurement results.

In the New Radio (NR) system, Non-Terrestrial Networks (NTNs) are introduced to provide communication services to users. However, a satellite moves at a high speed relative to the earth, and the effective service time provided by the satellite is usually only a few seconds to tens of seconds. The terminal device must quickly complete measurement and reporting so as to reduce a risk of disconnection from the network. Therefore, how to perform radio frequency signal measurement and cell measurement reporting is a problem to be solved.

SUMMARY

The present disclosure provides a measurement method, a terminal device, and a network device.

In a first aspect, a measurement method is provided. The method includes: relaxing, by a terminal device, a radio frequency measurement criterion and/or restricting, by the terminal device, cell measurement report content under a condition, or performing, by the terminal device, radio frequency signal measurement according to a first radio frequency measurement criterion, and/or performing, by the terminal device, cell measurement reporting according to a first measurement reporting criterion under a condition. The first radio frequency measurement criterion is a relaxed radio frequency measurement criterion relative to a second radio frequency measurement criterion. The first measurement reporting criterion is a restricted measurement reporting criterion relative to a second measurement reporting criterion.

In a second aspect, a terminal device is provided. The terminal device includes a processor and a memory. The memory is configured to store a computer program, and the processor is configured to invoke and execute the computer program stored in the memory to perform the method according to any of the above first aspect or any implementation thereof.

In a third aspect, a network device is provided. The network device includes a processor and a memory. The memory is configured to store a computer program, and the processor is configured to invoke and execute the computer program stored in the memory to perform operations including transmitting, by the network device, first instruction information to a terminal device. The first instruction information instructs the terminal device to relax a radio frequency measurement criterion and/or restrict cell measurement report content, or the first instruction information instructs the terminal device to perform radio frequency signal measurement based on a relaxed radio frequency measurement criterion and/or report a cell measurement result based on a restricted measurement reporting criterion.

BRIEF DESCRIPTION OF DRAWINGS

FIG. 3 is a schematic interaction diagram illustrating a measurement method according to an embodiment of the present disclosure.

FIG. 4 is a schematic block diagram of a terminal device according to an embodiment of the present disclosure.

FIG. 5 is a schematic block diagram of a terminal device according to an embodiment of the present disclosure.

DESCRIPTION OF EMBODIMENTS

Figure 1:
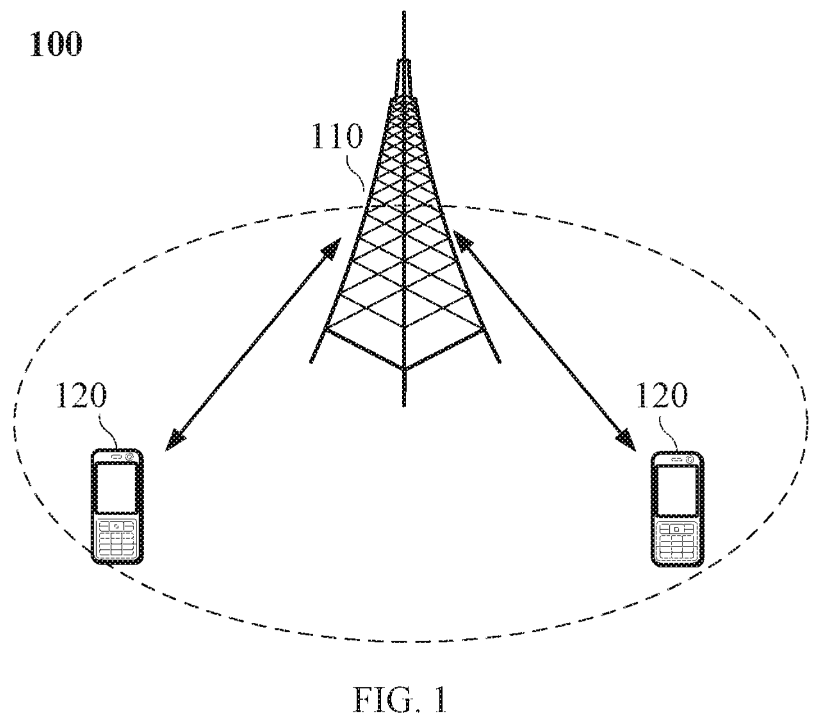
FIG. 1 is a schematic diagram showing an architecture of a communication system according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The technical solutions according to the embodiments of the present disclosure can be applied to various communication systems, such as a Global System of Mobile Communication (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolved NR system, an LTE-based access to unlicensed spectrum (LTE-U) system, an NR-based access to unlicensed spectrum (NR-U) system, an Non-Terrestrial Network (NTN) system, a Universal Mobile Telecommunication System (UMTS), a Wireless Local Area Networks (WLAN), Wireless Fidelity (WiFi), a 5th Generation (5G) system, or other communication systems.

Generally speaking, conventional communication systems support a limited number of connections and are easy to implement. However, with the development of communication technologies, mobile communication systems will support not only traditional communication, but also will support, for example, Device to Device (D2D) communication, Machine to Machine (M2M) communication, and Machine Type Communication (MTC), and Vehicle to Vehicle (V2V) communication, or Vehicle to everything (V2X) communication, etc. The embodiments of the present disclosure may also be applied to these communication systems.

Optionally, the communication system according to an embodiment of the present disclosure may be applied to a Carrier Aggregation (CA) scenario, a Dual Connectivity (DC) scenario, and a Standalone (SA) network deployment scenario, and the like.

Optionally, the communication system of an embodiment of the present disclosure may be applied to unlicensed spectrum. The unlicensed spectrum may also be considered as shared spectrum. Alternatively, the communication system of an embodiment of the present disclosure may be applied to licensed spectrum. The licensed spectrum may also be considered as non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, and may be a cellular phone, a cordless phone, a Session Initiation Protocol (SIP) phone, a Wireless Local Loop (WLL) station, a Personal Digital Assistant (PDA) device, a handheld device having a wireless communication function, a computing device or another processing device connected to a wireless modem, a vehicle-mounted device, a wearable device, a terminal device in a next generation communication system (e.g., NR network), or a terminal device in a future evolved Public Land Mobile Network (PLMN), etc.

In the embodiments of the present disclosure, the terminal device may be deployed on land, including indoor or outdoor, handheld, wearable, or vehicle-mounted terminal devices, may also be deployed on water (such as on a ship and the like), or may also be deployed on air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in self-driving, a wireless terminal device in remote medical, a wireless terminal device in smart grid, a wireless terminal device in transportation safety, a wireless terminal device in smart city, or a wireless terminal device in smart home, or the like.

As non-limiting examples, in an embodiment of the present disclosure, the terminal device may also be a wearable device. The wearable device may also be called a wearable smart device, which is a general term for wearable devices obtained through intelligently designed and development on daily wears by applying wearable technology, such as glasses, gloves, watches, dress, and shoes. A wearable device may be directly worn on the body or may be a portable device integrated into a user's clothing or accessory. The wearable device is not only a kind of hardware device, but also provide powerful functions based on software support, data interaction, and cloud interaction. In a broad sense, the wearable smart device may include those which have full functions and large size, and can provide all or partial functions without relying on a smart phone, such as smart watches, smart glasses and the like, and include those which only focus on a certain type of application function and need to be used along with other devices such as a smart phone, such as various smart bracelets, smart jewelry and the like for physical sign monitoring.

In an embodiment of the present disclosure, the network device may be a device for communicating with mobile devices. The network device may be an Access Point (AP) in a WLAN, a Base Transceiver Station (BTS) in GSM or CDMA, a NodeB (NB) in WCDMA, an Evolutional Node (eNB or eNodeB) in LTE, or a relay station or an Access Point, or a vehicle-mounted device, a wearable device, a network device (e.g., gNB) in an NR network, or a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station deployed on land, water, or the like.

In the embodiment of the present disclosure, a network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a Small cell. The Small cell here may include: an Metro cell, an Micro cell, a Pico cell, a Femto cell, or the like. These Small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device capable of communicating with a terminal device (or referred to as communication terminal or terminal) 120. The network device 110 may provide communication coverage for a particular geographic area, and may communicate with terminal devices located within the coverage area.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device with a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables, or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in a future communication system. The present disclosure is not limited to any of these examples.

In the 5G network environment, in order to reduce air interface signaling and quickly restore wireless connections and data services, a new Radio Resource Control (RRC) state, i.e., an RRC_INACTIVE state, is defined. This state is different from an RRC_IDLE state and an RRC_CONNECTED state.

In the RRC_IDLE state, mobility is terminal device based cell selection and reselection, paging is initiated by a Core Network (CN), and a paging area is configured by the CN. There is no terminal device Access Stratum (AS) context at the base station, and there is no RRC connection.

In the RRC_CONNECTED state, there is an RRC connection, and the base station and the terminal device have the terminal device AS context. The network device knows the location of the terminal device at the specific cell level. Mobility is mobility controlled by network device. Unicast data can be transmitted between the terminal device and the base station.

In the RRC_INACTIVE state, mobility is terminal device based cell selection and reselection, there is a connection between CN-NR, there is terminal device AS context on a certain base station, paging is triggered by a Radio Access Network (RAN), and RAN-based paging area is managed by the RAN, and the network device knows the location of the terminal device at the RAN-based paging area level.

It should be noted that, in the embodiments of the present disclosure, the inactive state may also be referred to as deactivated state, and the present disclosure is not limited to this.

A measurement result of any radio signal reported by a terminal device needs to be subjected to a certain evaluation process. On one hand, the signal is unstable due to the varying radio signal propagation environment, and the terminal device needs to average a plurality of measurement results to avoid signal measurement and evaluation errors caused by sudden changes in environmental factors. On the other hand, there are errors in radio frequency measurement itself by the terminal device, and the terminal device needs to average a plurality of measurement results to avoid signal measurement and evaluation errors caused by a single error. Therefore, some radio frequency measurement criteria have been formulated to ensure that effective measurement by the terminal device.

In some embodiments, radio frequency measurement criteria include at least two aspects.

A first aspect: a requirement on a minimum number of times the terminal device samples a radio frequency signal and a requirement on a minimum sampling time interval between consecutive sampling processes of any radio frequency signal performed by the terminal device. The former is to avoid an evaluation error caused by a single signal evaluation method, and to reduce the measurement error by averaging multiple sampling results. The latter is to avoid the inaccuracy of dense sampling. Signal fluctuations are typically concentrated in a certain period of time. If the terminal device performs sampling densely during this period, it will not be able to obtain a real evaluation result of the radio frequency signal. Thus, by specifying the minimum sampling time interval, near randomization of consecutive sampling processes can be achieved, and thus the measurement accuracy can be improved.

A second aspect: the measurement accuracy of the terminal device. For example, different frequency bands can be specified, such as a high frequency and a low frequency, and different signal measurement accuracy can be defined respectively. The manufacturers of terminal devices should provide corresponding products according to the specified measurement accuracy requirements for different frequency bands.

The terminal device in a connected state needs to perform measurement according to the requirements of the measurement configuration and report the corresponding measurement results. The measurement results include measurement results of a serving cell and/or measurement results of a neighboring cell. The reported measurement quantities can be any combination of cell-level and/or beam-level Reference Signal Received Power (RSRP)/Reference Signal Received Quality (RSRQ)/Signal to Interference plus Noise Ratio (SINR). If the terminal device is in a restriction range in a measurement report configuration configured by the network, it reports the measurement results of cells for which available measurement results have obtained.

In the New Radio (NR) system, Non-Terrestrial Networks (NTNs) are introduced to provide communication services to users. However, a satellite moves at a high speed relative to the earth, and the effective service time provided by the satellite is typically only a few seconds to tens of seconds. The terminal device needs quickly complete measurement and reporting so as to reduce the risk of disconnection from the network. Therefore, how to perform radio frequency signal measurement and cell measurement reporting is a problem to be solved.

In order to facilitate understanding of the technical solutions of the embodiments of the present disclosure, the technical solutions of the present disclosure will be described in detail below with reference to specific embodiments. As alternative solutions, the related art below may be combined with the technical solutions of the embodiments of the present disclosure arbitrarily, and all of these combinations belong to the protection scope of the embodiments of the present disclosure. The embodiments of the present disclosure include at least part of the following content.

Figure 2:
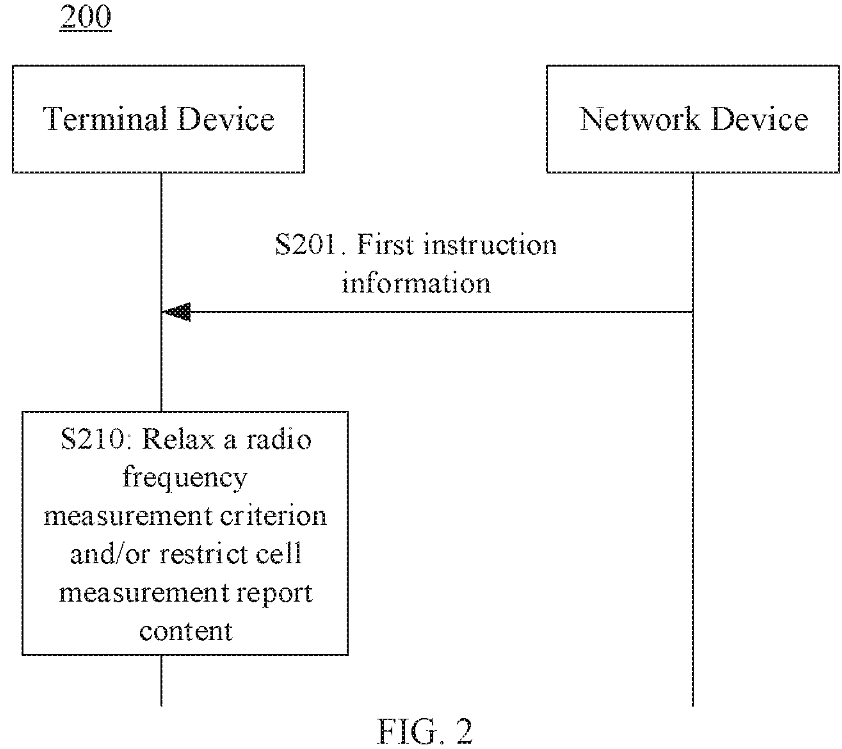
FIG. 2 is a schematic interaction diagram illustrating a measurement method according to an embodiment of the present disclosure.

FIG. 2 is a schematic interaction diagram illustrating a measurement method 200 according to an embodiment of the present disclosure. As shown in FIG. 2, the method 200 includes the following content.

At S210, a terminal device relaxes a radio frequency measurement criterion and/or restricts cell measurement report content under a condition.

Therefore, in the embodiment of the present disclosure, under the condition, the terminal device can expedite the measurement process of the terminal device by relaxing the radio frequency measurement criterion and/or restricting the cell measurement report content, so as to meet the requirements of an NTN scenario. Specifically, on one hand, relaxing the radio frequency measurement criterion is beneficial to reducing the risk of disconnection from the network. On the other hand, restricting the cell measurement report content can reduce measuring and reporting overhead, thereby ensuring the reliability of data reporting and saving energy consumption of the terminal device.

In an embodiment of the present disclosure, the terminal device can be in any of the following states:

an RRC_IDLE state, an RRC_INACTIVE state, and an RRC_CONNECTED state.

In other words, the relaxing of the radio frequency measurement criterion may be applicable to the terminal device in at least one of the following states:

an RRC_IDLE state, an RRC_INACTIVE state, and an RRC_CONNECTED state.

The restricting of the cell measurement report content may be applicable to the terminal device in at least one of the following states:

an RRC_IDLE state, an RRC_INACTIVE state, and an RRC_CONNECTED state.

In some embodiments, the relaxing of the radio frequency measurement criterion may refer to performing radio frequency signal measurement based on a first radio frequency measurement criterion.

In some embodiments, the first radio frequency measurement criterion may be one of at least one relaxed radio frequency measurement criterion.

Optionally, the at least one relaxed radio frequency measurement criterion may be predefined, or configured by a network device.

For example, the network device may configure the at least one relaxed radio frequency measurement criterion via Radio Resource Control (RRC) signaling.

Optionally, in some embodiments, the first radio frequency measurement criterion may be a default relaxed radio frequency measurement criterion. That is, under the condition, the terminal device may use the default relaxed radio frequency measurement criterion to perform radio frequency signal measurement.

In some embodiments, the relaxed radio frequency measurement criterion may be a relaxed radio frequency measurement criterion relative to a second radio frequency measurement criterion.

Optionally, the second radio frequency measurement criterion may be a radio frequency measurement criterion used for terrestrial cell measurement.

In some embodiments, the first radio frequency measurement criterion may be a relaxed radio frequency measurement criterion relative to the second radio frequency measurement criterion.

In some embodiments, the second radio frequency measurement criterion includes at least the following measurement restriction conditions:

- a requirement on a minimum number of times the terminal device samples a radio frequency signal (typically represented as a multiple of Discontinuous Reception (DRX) cycle), denoted as a first sampling number threshold;
- a requirement on a minimum sampling time interval between consecutive sampling processes of a radio frequency signal performed by the terminal device, denoted as a first sampling time interval threshold;
- a requirement on a measurement accuracy of a radio frequency receiver of the terminal device, denoted as a first measurement accuracy threshold; or
- a requirement on an algorithm complexity for the terminal device to combine a plurality of sampling results of a radio frequency signal, denoted as a first algorithmic complexity.

In some embodiments of the present disclosure, the relaxing of the radio frequency measurement criterion may include: using less measurement restriction conditions, and/or using relaxed parameter values corresponding to the measurement restriction conditions.

In some embodiments, the relaxing of the radio frequency measurement criterion may include at least one of the following schemes:

- Scheme 1: relaxing a requirement on a minimum number of times the terminal device samples a radio frequency signal;
- Scheme 2: relaxing a requirement on a minimum sampling time interval between consecutive sampling processes of a radio frequency signal performed by the terminal device;
- Scheme 3: relaxing a requirement on a measurement accuracy of a radio frequency receiver of the terminal device; or
- Scheme 4: relaxing a requirement on an algorithm complexity for the terminal device to combine a plurality of sampling results of a radio frequency signal.

In the following, specific implementations of Schemes 1 to 4 will be described with reference to specific examples.

Scheme 1

In some embodiments, the relaxing of the requirement on the minimum number of times the terminal device samples the radio frequency signal may refer to specifying the requirement on the minimum number of times the terminal device samples the radio frequency signal as a second sampling number threshold. The second sampling number threshold is smaller than the first sampling number threshold.

As an example, if the second radio frequency measurement criterion specifies that the terminal device needs to sample a radio frequency signal at least 8 times to determine a measurement evaluation result of the radio frequency signal, i.e., the first sampling number threshold is 8, then the relaxing of the radio frequency measurement criterion may include specifying that the terminal device needs to sample a radio frequency signal at least X times to determine the measurement evaluation result of the radio frequency signal, where X is smaller than 8, for example X is 4.

Scheme 2

In some embodiments, the relaxing of the requirement on the minimum sampling time interval between consecutive sampling processes of the radio frequency signal performed by the terminal device may refer to specifying the requirement on the minimum sampling time interval between consecutive sampling processes of the radio frequency signal performed by the terminal device as a second sampling time interval threshold. The second sampling time interval threshold is smaller than the first sampling time interval threshold.

As an example, if the second radio frequency measurement criterion specifies that the minimum sampling time interval between consecutive sampling processes for the terminal device to obtain a measurement evaluation result of a radio frequency signal is half a Discontinuous Reception (DRX) cycle. That is, the first sampling time interval threshold is half the DRX cycle, then the relaxing of the radio frequency measurement criterion may include specifying that the minimum sampling time interval between consecutive sampling processes for the terminal device to obtain the measurement evaluation result of the radio frequency signal is Y, where Y is smaller than half the DRX cycle, for example, Y is a quarter of a DRX cycle.

Scheme 3

In some embodiments, the relaxing of the requirement on the measurement accuracy of the radio frequency receiver of the terminal device may refer to specifying the requirement on the measurement accuracy of the radio frequency receiver of the terminal device as a second measurement accuracy threshold. The second measurement accuracy threshold is smaller than the first measurement accuracy threshold.

As an example, if the second radio frequency measurement criterion specifies that the terminal device should meet the first measurement accuracy requirement when measuring a radio frequency signal in a certain frequency range, the relaxing of the radio frequency measurement criterion may include specifying that the terminal device should meet a second measurement accuracy threshold when measuring the radio frequency signal in the certain frequency range. The second measurement accuracy threshold is smaller than the first measurement accuracy threshold, so as to expedite the measurement process of the terminal device.

Scheme 4

Relaxing a requirement on an algorithm complexity for combining a plurality of sample signals.

In some embodiments, the relaxing of the requirement on the algorithm complexity for the terminal device to combine the plurality of sampling results of the radio frequency signal may refer to specifying the requirement on the algorithm complexity for combining the plurality of sampling results of the radio frequency signal as a second algorithm complexity. The second algorithm complexity is lower than the first algorithm complexity.

It can be understood that for different algorithm complexities for combining a plurality of samples of a radio frequency signal, time required for calculation would be different. The relaxing of the radio frequency measurement criterion includes lowering the complexity of the combining algorithm, e.g., simplifying the steps of the combining algorithm, so as to expedite the measurement process of the terminal device.

In some embodiments, the first radio frequency measurement criterion being the relaxed radio frequency measurement criterion relative to the second radio frequency measurement criterion may refer to:

a number of measurement restriction conditions included in the first radio frequency measurement criterion being smaller than a number of measurement restriction conditions included in the second radio frequency measurement criterion, and/or a parameter value of a measurement restriction condition included in the first radio frequency measurement criterion is smaller than a parameter value of a corresponding measurement restriction condition in the second radio frequency measurement criterion.

For example, the first radio frequency measurement criterion may include the second sampling number threshold, the second radio frequency measurement criterion may include the first sampling number threshold, and the second sampling number threshold may be smaller than the first sampling number threshold.

In another example, the first radio frequency measurement criterion may include the second sampling time interval threshold, the second radio frequency measurement criterion may include the first sampling time interval threshold, and the second sampling time interval threshold may be smaller than the first sampling time interval threshold.

In yet another example, the first radio frequency measurement criterion may not include the requirement on the algorithm complexity for combining the plurality of sampling results of the radio frequency signal, and the second radio frequency measurement criterion may include the requirement on the algorithm complexity for combining the plurality of sampling results of the radio frequency signal.

In an embodiment of the present disclosure, the restricting of the cell measurement report content may refer to reporting less content. The less content here may be relative to the measurement report of a terrestrial cell.

In some embodiments, the restricting of the cell measurement report content may refer to performing measurement reporting based on a first measurement reporting criterion.

In some embodiments, the first measurement reporting criterion may be one of at least one restricted measurement reporting criterion.

Optionally, the at least one restricted measurement reporting criterion may be predefined, or configured by a network device. For example, the network device may configure the at least one restricted measurement reporting criterion via RRC signaling.

Optionally, in some embodiments, the first measurement reporting criterion may be a default restricted measurement reporting criterion. That is, under a certain condition, the terminal device may use the default restricted measurement reporting criteria to perform measurement reporting.

In some embodiments, the restricted cell measurement report content may be restricted cell measurement report content relative to a second measurement reporting criterion.

Optionally, the second measurement reporting criterion may be a measurement reporting criterion for terrestrial cell measurement.

In some embodiments, the first measurement reporting criterion is a restricted measurement reporting criterion relative to the second measurement reporting criterion.

In some embodiments, the second measurement reporting criterion may specify that the terminal device reports the measurement results of cells for which available measurement results have obtained. The measurement results here may include at least one of RSRP, RSRQ, and SNIR, and the cells may include a serving cell and/or a neighboring cell.

For example, if the RSRP and RSRQ of the serving cell and the RSRP and RSRQ of a neighboring cell 1 have been obtained, the obtained measurement results may be reported.

In some embodiments, the following report items may need to be reported based on the second measurement reporting criterion:

a Measurement Identity (ID), Physical Cell Identifier (PCI) information, and measurement result information.

Optionally, the measurement result information may include at least one of measurement results of RSRP, RSRQ, and SNIR of the serving cell, and/or at least one of measurement results of RSRP, RSRQ, and SNIR of the neighboring cell.

It should be understood that the measurement results reported by the terminal device based on the second measurement reporting criterion may include all obtained measurement results.

In some embodiments of the present disclosure, the restricting of the cell measurement report content may include: restricting the cell measurement report content of a serving cell and/or restricting the cell measurement report content of a neighboring cell.

In some embodiments, the restricting of the cell measurement report content may include at least one of:

including at least a measurement result of a neighboring cell;

including at least PCI information of a measured cell;

including at least an RSRP measurement result of a measured cell;

including at least an RSRQ measurement result of a measured cell;

including at least an SINR measurement result of a measured cell;

including at least index information of ephemeris data associated with a measured cell; or restricting a maximum number of cells for which measurement results can be reported.

In some embodiments, the including of at least the measurement result of the neighboring cell can be understood as the network device mainly caring about the measurement result of the neighboring cell. In this case, even if the terminal device obtains the measurement result of the serving cell, it may not report it, which can reduce the signaling overhead of measurement reporting and expedite the measurement reporting process of the terminal device.

As an example, the including of at least the measurement result of the neighboring cell may also be including at least an RSRP measurement result of the neighboring cell. In this case, it can be understood as the network device mainly caring about the RSRP measurement result of the neighboring cell.

As another example, the including of at least the measurement result of the neighboring cell may also be including at least an RSRQ measurement result of the neighboring cell. In this case, it can be understood as the network device mainly caring about the RSRQ measurement result of the neighboring cell.

As yet another example, the including of at least the measurement result of the neighboring cell may also be including at least an SINR measurement result of the neighboring cell. In this case, it can be understood as the network device mainly caring about the SINR measurement result of the neighboring cell.

In some embodiments, the including of at least the PCI information of the measured cell can be understood as the network device mainly caring about the PCI information of the measured cell. In this case, even if the terminal device obtains the measurement result of the serving cell or the measurement result of the neighboring cell, it may not report it, which can reduce the signaling overhead of measurement reporting and expedite the measurement reporting process of the terminal device.

In some embodiments, the including of at least the RSRP measurement result of the measured cell can be understood as the network device mainly caring about the RSRP measurement result of the measured cell. In this case, even if the terminal device obtains the SINR measurement result or RSRQ measurement result of the measured cell, it may not report it, which can reduce the signaling overhead of measurement reporting and expedite the measurement reporting process of the terminal device.

In some embodiments, the including of at least the RSRQ measurement result of the measured cell can be understood as the network device mainly caring about the RSRQ measurement result of the measured cell. In this case, even if the terminal device obtains the SINR measurement result or RSRP measurement result of the measured cell, it may not report it, which can reduce the signaling overhead of measurement reporting and expedite the measurement reporting process of the terminal device.

In some embodiments, the including of at least the SINR measurement result of the measured cell can be understood as the network device mainly caring about the SINR measurement result of the measured cell. In this case, even if the terminal device obtains the RSRQ measurement result or RSRP measurement result of the measured cell, it may not report it, which can reduce the signaling overhead of measurement reporting and expedite the measurement reporting process of the terminal device.

By restricting an upper limit of the number of cells number of cells for which measurement results are to be reported or restricting the content of the report, the cell measurement report content can be reduced and the measurement report process of the terminal device can be expedited.

Optionally, the measured cell may include a serving cell and/or a neighboring cell, and the neighboring cell may include at least one cell.

In some embodiments, the first measurement reporting criterion may be used to specify that the measurement reporting follows at least one of the following criteria:

reporting at least a measurement result of a neighboring cell;

reporting at least PCI information of a measured cell;

reporting at least an RSRP measurement result of a measured cell;

reporting at least an RSRQ measurement result of a measured cell;

reporting at least an SINR measurement result of a measured cell;

reporting at least index information of ephemeris data associated with a measured cell; or restricting a maximum number of cells for which measurement results can be reported.

For the meaning of each specific criterion in the first measurement reporting criterion, reference can be made to the relevant description of the restricting of the cell measurement report content, and for the sake of brevity, details will not be repeated here.

In some embodiments, the upper limit of the number of cells for which the terminal device can report the measurement results as specified by the first measurement reporting criterion may be smaller than the upper limit of the number of cells for which the terminal device can report the measurement results as specified by the second measurement reporting criterion.

For example, the second measurement reporting criterion may specify that the terminal device can report the measurement results of up to 8 cells at one frequency point, and the first measurement reporting criterion may specify that the terminal device can report the measurement results of up to 4 cells at one frequency point.

In some embodiments, the RSRP measurement result of the measured cell may include a cell-level measurement result of the RSRP of the measured cell and/or a beam-level measurement result of the RSRP of the measured cell.

In some embodiments, the RSRQ measurement result of the measured cell may include a cell-level measurement result of the RSRQ of the measured cell and/or a beam-level measurement result of the RSRQ of the measured cell.

In some embodiments, the SINR measurement result of the measured cell may include a cell-level measurement result of the SINR of the measured cell and/or a beam-level measurement result of the SINR of the measured cell.

In some embodiments, the RSRP measurement result of the measured cell may be obtained by measuring a measurement reference signal; the RSRQ measurement result of the measured cell may be obtained by measuring a measurement reference signal; and/or the SINR measurement result of the measured cell may be obtained by measuring a measurement reference signal.

Optionally, the measurement reference signal may be a Synchronization Signal Block (SSB) or a Channel State Information Reference Signal (CSI-RS).

In some embodiments, ephemeris data is used to determine the time-varying spatial position and time-varying spatial velocity of the satellite, which typically requires a plurality of parameters for representation. By configuring the corresponding index information for the ephemeris data to indicate the plurality of parameters, the signaling overhead for measurement reporting can be reduced.

As an example, different index information can be configured for different ephemeris data. As long as the different index information can distinguish different ephemeris data from each other, the present disclosure is not limited to any specific value of the index information. Table 1 is an example of the correspondence between ephemeris data and indices.

TABLE 1

| Index 1 | Index 2 | . . . | Index N |
| --- | --- | --- | --- |
| Ephemeris data 1 | Ephemeris data 2 | . . . | Ephemeris data N |

Here, N is an integer greater than 1.

As another example, different index information can be configured for different ephemeris data. The index information may be a position number of the ephemeris data in an ephemeris data list, and, for example, the position number may start from 0 or 1. Table 2 is an example of the correspondence between ephemeris data and position numbers.

TABLE 2

| List element position number 1 | List element position number 2 | . . . | List element position number N |
| --- | --- | --- | --- |
| Ephemeris data 1 | Ephemeris data 2 | . . . | Ephemeris data N |

Here, N is an integer greater than 1.

In an embodiment of the present disclosure, both the relaxing of the radio frequency measurement criterion and the restricting of the cell measurement report content can be regarded as operations for simplifying the measurement process and expediting the measurement process of the terminal device.

In an embodiment of the present disclosure, the terminal device may perform the above operations for simplifying the measurement process under a specific condition.

In some embodiments of the present disclosure, as shown in FIG. 2, the method may further include the following.

At S201, the terminal device receives first instruction information transmitted by a network device.

Further, the terminal device may perform an operation of simplifying measurement according to the first instruction information.

Optionally, in some embodiments, the first instruction information may be carried by at least one of:

a system broadcast messages; or dedicated signaling.

In some embodiments, the dedicated signaling may include, for example, RRC signaling.

In some embodiments of the present disclosure, the first instruction information may instruct the terminal device to relax the radio frequency measurement criterion and/or restrict the cell measurement report content.

In some embodiments, the first instruction information may include one bit for instructing the terminal device to relax the radio frequency measurement criterion and/or restrict the cell measurement report content.

For example, the value of the one bit may be 0, for instructing the terminal device to relax the radio frequency measurement criterion, or the value of the one bit may be 1, for instructing the terminal device to restrict the cell measurement report content.

In another example, the value of the one bit may be 0, for instructing the terminal device to relax the radio frequency measurement criterion, or the value of the one bit may be 1, for instructing relaxing the radio frequency measurement criterion and restricting the cell measurement report content.

In another example, the value of the one bit may be 0, instructing the terminal device to restrict the cell measurement report content, or the value of the one bit may be 1, instructing relaxing the radio frequency measurement criterion and restricting the cell measurement report content.

It should be understood that the embodiments of the present disclosure are only described with reference to examples where the measurement process is simplified by relaxing the radio frequency measurement criterion and restricting the cell measurement report content. In other embodiments, other methods may also be used to simplify the measurement process, and the present disclosure is not limited to this.

In other embodiments, the first instruction information may include a plurality of third bits each corresponding to an operation for simplifying the measurement process, and the value of each third bit indicates whether to perform the corresponding operation.

Taking the simplifying of the measurement process by relaxing the radio frequency measurement criterion and restricting the cell measurement report content as an example, the first instruction information may include two third bits (B1 and B0). For example, B0 indicates whether to relax the radio frequency measurement criterion, and B1 indicates whether to restrict the cell measurement report content. If the value of the two third bits is 10, it indicates restricting of the cell measurement report content and not relaxing the radio frequency measurement criterion, for example, the radio frequency signal measurement may be performed according to the second radio frequency measurement criterion.

In some other embodiments, the first instruction information may include a plurality of bits, and the plurality of bits are used to instruct the terminal device to relax the radio frequency measurement criterions and/or restrict the cell measurement report content.

In an implementation, the different values of the plurality of bits may be used to instruct the terminal device to relax the radio frequency measurement criterion and/or restrict the cell measurement report content.

As an example, the plurality of bits are 3 bits, and different values of the 3 bits are used for the terminal device to relax the radio frequency measurement criterion and/or restrict the cell measurement report content. Table 3 shows an example of indicating different operations for simplifying the measurement process via the different values of 3 bits.

TABLE 3

| 000 | 001 | 010 | 011~111 |
|---|---|---|---|
| An indication of relaxing the radio frequency measurement criterion | An indication of restricting the cell measurement report content | An indication of relaxing the radio frequency measurement criterion and restricting the cell measurement report content | Reserved |

It should be understood that, in this implementation, the first instruction information does not specifically indicate which measurement restriction conditions are relaxed or which content is restricted from measurement reporting.

In some embodiments, when the first instruction information indicates relaxing of the radio frequency measurement criterion, which measurement restriction conditions are specifically relaxed may be predefined, or by default. For example, when the first instruction information indicates relaxing of the radio frequency measurement criterion, the requirement on the minimum number of times the terminal device samples the radio frequency signal and/or the requirement on the minimum sampling time interval between consecutive sampling processes of the radio frequency signal performed by the terminal device may be relaxed by default.

In some other embodiments, when the first instruction information indicates relaxing of the radio frequency measurement criterion, the terminal device may perform radio frequency signal measurement according to the first radio frequency measurement criterion by default.

In some embodiments, when the first instruction information indicates restricting of the cell measurement report content, which content is specifically restricted from measurement reporting may be predefined, or by default. For example, when the first instruction information indicates restricting of the cell measurement report content, at least the PCI information of the measured cell may be reported, and/or at least the RSRP measurement result of the measured cell may be reported by default.

In some other embodiments, when the first instruction information indicates restricting of the cell measurement report content, the terminal device may perform measurement reporting according to the first measurement reporting criterion by default.

In some other embodiments of the present disclosure, the first instruction information may also indicate relaxing of the radio frequency measurement criterion at a finer granularity.

In an implementation, which radio frequency measurement criterion is relaxed may be indicated by means of a bitmap.

As an example, the second radio frequency measurement criterion may include at least one measurement restriction condition, for example, the measurement restriction condition described above, and the first instruction information may include a plurality of first bits each corresponding to at least one measurement restriction condition. The different values of each first bit may indicate whether to relax the measurement restriction condition corresponding to the first bit.

In another implementation, the second radio frequency measurement criterion may include at least one measurement restriction condition, the first instruction information may include a plurality of bits, and different values of the plurality of bits may indicate target measurement restrictions conditions to be relaxed.

In Table 4, taking 3 bits as an example, different values of the 3 bits indicate examples of the above four relaxing schemes.

TABLE 4

| 000 | 001 | 010 | 011 | 100 | 101 | 110 | 111 |
|---|---|---|---|---|---|---|---|
| Scheme 1 | Scheme 2 | Scheme 3 | Scheme 4 | Reserved | Reserved | Reserved | Reserved |

In some other embodiments of the present disclosure, the first instruction information may also indicate the restricting of the measurement report content at a finer granularity.

In an implementation, which measurement report content is restricted may be indicated by means of a bitmap.

As an example, the cell measurement report content may include at least one report item, for example, the measurement report content shown above, the first instruction information may include a plurality of second bits each corresponding to at least one report item, and the different values of each second bit may indicate whether to restrict reporting of the report item corresponding to the second bit.

In another implementation, the cell measurement report content may include at least one report item, the first instruction information may include a plurality of bits, and different values of the plurality of bits may indicate a target report item to be restricted.

In other embodiments of the present disclosure, the first instruction information may instruct the terminal device to perform radio frequency signal measurement based on the relaxed radio frequency measurement criterion and/or to report a cell measurement result based on the restricted measurement reporting criterion.

In some embodiments, when the first instruction information indicates performing the radio frequency signal measurement based on the relaxed radio frequency measurement criterion, the terminal device may perform the radio frequency signal measurement according to the first radio frequency measurement criterion by default.

In some embodiments, when the first instruction information indicates reporting the cell measurement result based on the restricted measurement reporting criterion, the terminal device may perform measurement reporting according to the first measurement reporting criterion by default.

In some other embodiments of the present disclosure, the first instruction information may be used to instruct the terminal device to perform radio frequency signal measurement based on the first radio frequency measurement criterion and/or to perform cell measurement result reporting based on the first measurement reporting criterion.

In some embodiments, the first radio frequency measurement criterion may be one of at least one relaxed radio frequency measurement criterion, that is, the network device may use the first instruction information to indicate to the terminal device which of the at least one relaxed radio frequency measurement criterion is to be used for radio frequency signal measurement.

In an implementation, the network device may indicate to the terminal device which radio frequency measurement criterion is to be used for performing radio frequency signal measurement via a bitmap.

For example, there may be three predefined relaxed radio frequency measurement criteria (denoted as Radio Frequency Measurement Criterion 1 to Radio Frequency Measurement Criterion 3), the first instruction information may use 3 bits (B2 to B0) to indicate which radio frequency measurement criterion to be enabled by the terminal device for radio frequency signal measurement. For example, a bit of 0 indicates disabled, and a bit of 1 indicates enabled.

TABLE 5

| B0 | B1 | B2 |
|---|---|---|
| Radio Frequency Measurement Criterion 1 | Radio Frequency Measurement Criterion 2 | Radio Frequency Measurement Criterion 3 |

If B0 is 1 and B1 and B2 are both 0, the terminal device may determine to use Radio Frequency Measurement Criterion 1 for performing radio frequency signal measurement.

In another implementation, the first instruction information may include at least one bit, different values of the at least one bit correspond to different radio frequency measurement criteria, and the network device may use the value of the at least one bit to indicate which radio frequency measurement criterion to be used for radio frequency signal measurement.

For example, three relaxed radio frequency measurement criteria (denoted as Radio Frequency Measurement Criterion 1 to Radio Frequency Measurement Criterion 3) may be predefined, and the first instruction information may indicate which radio frequency measurement criterion is to be enabled by the terminal device for radio frequency signal measurement via 2 bits. For example, as shown in Table 6, 00 indicates that Radio Frequency Measurement Criterion 1 is enabled, 01 indicates that Radio Frequency Measurement Criterion 2 is enabled, and 10 indicates that Radio Frequency Measurement Criterion 3 is enabled.

TABLE 6

| 00 | 01 | 10 | 11 |
|---|---|---|---|
| Radio Frequency Measurement Criterion 1 | Radio Frequency Measurement Criterion 2 | Radio Frequency Measurement Criterion 3 | Reserved |

In some embodiments, the first measurement reporting criterion may be one of at least one restricted measurement reporting criterion, that is, the network device may use the first instruction information to indicate to the terminal device which of the at least one restricted measurement reporting criterion is to be used by the terminal device for measurement reporting.

In an implementation, the network device may indicate which measurement reporting criterion is to be used for measurement reporting via a bitmap.

For example, three restricted measurement reporting criteria (referred to as Measurement Reporting Criterion 1 to Measurement Reporting Criterion 3) may be predefined, and the first instruction information may indicate which measurement reporting criterion is to be enabled by the terminal device for measurement reporting using 3 bits (B2 to B0). For example, a bit of 0 indicates disabled, and a bit of 1 indicates enabled.

TABLE 5

| B0 | B1 | B2 |
|---|---|---|
| Measurement Reporting Criteria 1 | Measurement Reporting Criteria 2 | Measurement Reporting Criteria 3 |

If B0 is 1 and B1 and B2 are both 0, the terminal device may determine to use Measurement Reporting Criterion 1 to perform measurement reporting.

In another implementation, the first instruction information may include at least one bit, and different values of the at least one bit correspond to different measurement reporting criteria, and the network device may use the value of the at least one bit to indicate which measurement reporting criterion is to be used for measurement reporting.

For example, three restricted measurement reporting criteria (denoted as Measurement Reporting Criterion 1 to Measurement Reporting Criterion 3) may be predefined, and the first instruction information may indicate which measurement reporting criterion is to be enabled by the terminal device for measurement reporting using 2 bits. For example, as shown in Table 6, 00 indicates that Measurement Reporting Criterion 1 is enabled, 01 indicates that Measurement Reporting Criterion 2 is enabled, and 10 indicates that Measurement Reporting Criterion 3 is enabled.

TABLE 6

| 00 | 01 | 10 | 11 |
|---|---|---|---|
| Measurement Reporting Criteria 1 | Measurement Reporting Criteria 2 | Measurement Reporting Criteria 3 | Reserved |

In some embodiments of the present disclosure, the terminal device may also perform an operation for simplifying the measurement process according to a predetermined rule.

Optionally, the predetermined rule may be a predefined rule, or a rule negotiated between the terminal device and the network device.

In some embodiments, the predetermined rule may define in which scenario the terminal device is to perform the operation for simplifying the measurement process, or which operation for simplifying the measurement process is to perform in some scenarios.

As an example, the predetermined rule may include at least one of:

the terminal device supporting communication with a non-terrestrial cell, and the terminal device relaxing the radio frequency measurement criterion and/or restricting the cell measurement report content when a current serving cell of the terminal device is a non-terrestrial cell; or the terminal device being a specific type of terminal.

Optionally, the specific type of terminal may be a terminal that supports communication with a non-terrestrial cell, or a terminal with high mobility, or a terminal that needs to relax the radio frequency measurement criterion and/or restrict the cell measurement report content, etc.

To summarize, the terminal device can relax the radio frequency measurement criterion and/or restrict the cell measurement report content based on the instruction from the network device or based on the predetermined rule. On one hand, relaxing the radio frequency measurement criterion is beneficial to reducing the risk of disconnection from the network. On the other hand, restricting the cell measurement report content can reduce measuring and reporting overhead, thereby ensuring the reliability of data reporting and saving energy consumption of the terminal device.

FIG. 3 is a schematic interactive diagram illustrating a measurement method according to another embodiment of the present disclosure. As shown in FIG. 3, the method 300 may include the following.

At S310, a terminal device performs radio frequency signal measurement according to a first radio frequency measurement criterion, and/or performs cell measurement reporting according to a first measurement reporting criterion under a condition.

The first radio frequency measurement criterion is a relaxed radio frequency measurement criterion relative to a second radio frequency measurement criterion.

The first measurement reporting criterion is a restricted measurement reporting criterion relative to a second measurement reporting criterion.

It should be understood that, for the specific implementation of the first radio frequency measurement criterion, the second radio frequency measurement criterion, the first measurement reporting criterion, and the second measurement reporting criterion, reference can be made to the relevant description of the method 200, and for the sake of brevity, details thereof will not be repeated here.

In some embodiments of the present disclosure, the first radio frequency measurement criterion being the relaxed radio frequency measurement criterion relative to the second radio frequency measurement criterion may include:

a number of measurement restriction conditions included in the first radio frequency measurement criterion being smaller than a number of measurement restriction conditions included in the second radio frequency measurement criterion, and/or a parameter value of a measurement restriction condition included in the first radio frequency measurement criterion is smaller than a parameter value of a corresponding measurement restriction condition in the second radio frequency measurement criterion.

In some embodiments of the present disclosure, the measurement restriction condition may include at least one of:

a requirement on a minimum number of times sampling a radio frequency signal;

a requirement on a minimum sampling time interval between consecutive sampling processes of a radio frequency signal performed by the terminal device;

a requirement on a measurement accuracy of a radio frequency receiver of the terminal device; or a requirement on an algorithm complexity of combining a plurality of sampling results of a radio frequency signal.

In some embodiments of the present disclosure, the method may further include the following.

At S301, the terminal device receives first instruction information from a network device.

Further, S310 may include:

performing, by the terminal device, the radio frequency signal measurement according to the first radio frequency measurement criterion, and/or performing, by the terminal device, the cell measurement reporting according to the first measurement reporting criterion according to first instruction information, the first instruction information instructing the terminal device to perform the radio frequency signal measurement according to a relaxed radio frequency measurement criterion, and/or the first instruction information instructing the terminal device to perform the cell measurement reporting according to a restricted measurement reporting criterion.

It should be understood here that, for the specific implementation of the first instruction information, reference can be made to the related implementation of the first instruction information in the method 200, and details thereof will not be repeated here for brevity.

In some embodiments of the present disclosure, the first instruction information may be carried by at least one of: a system broadcast message; or dedicated signaling.

In some embodiments of the present disclosure, S310 may include:

performing, by the terminal device, the radio frequency signal measurement according to the first radio frequency measurement criterion, and/or performing, by the terminal device, the cell measurement reporting according to the first measurement reporting criterion according to a predetermined rule.

In some embodiments of the present disclosure, the predetermined rule may include at least one of:

the terminal device supporting communication with a non-terrestrial cell, and the terminal device relaxing the radio frequency measurement criterion and/or restricting the cell measurement report content when a current serving cell of the terminal device is a non-terrestrial cell; or the terminal device being a specific type of terminal.

In some embodiments of the present disclosure, the first measurement reporting criterion being the restricted measurement reporting criterion relative to the second measurement reporting criterion may include:

cell measurement report content required to be reported based on the first measurement reporting criterion being less than cell measurement report content required to be reported based on the second measurement reporting criterion.

In some embodiments of the present disclosure, the cell measurement report content reported based on the first measurement reporting criterion being less than the cell measurement report content reported based on the second measurement reporting criterion may include:

- measurement report content of a serving cell reported based on the first measurement reporting criterion being less than measurement report content of the serving cell reported based on the second measurement reporting criterion; and/or
- measurement report content of at least one neighboring cell reported based on the first measurement reporting criterion being less than measurement report content of the neighboring cell reported based on the second measurement reporting criterion.

In some embodiments of the present disclosure, the first measurement reporting criterion indicating that the cell measurement report content to be reported may include at least one of:

- including at least a measurement result of a neighboring cell;
- including at least Physical Cell Identifier (PCI) information of a measured cell;
- including at least an RSRP measurement result of a measured cell;
- including at least an RSRQ measurement result of a measured cell;
- including at least an SINR measurement result of a measured cell;
- including at least index information of ephemeris data associated with a measured cell; or
- restricting a maximum number of cells for which measurement results can be reported.

In some embodiments of the present disclosure, the RSRP measurement result of the measured cell may be a cell-level measurement result of the measured cell or a beam-level measurement result of the measured cell; and/or the RSRQ measurement result of the measured cell may be a cell-level measurement result of the measured cell or a beam-level measurement result of the measured cell; and/or the SINR measurement result of the measured cell may be a cell-level measurement result of the measured cell or a beam-level measurement result of the measured cell.

In some embodiments of the present disclosure, the RSRP measurement result of the measured cell may be obtained by measuring a measurement reference signal; and/or the RSRQ measurement result of the measured cell may be obtained by measuring a measurement reference signal; and/or the SINR measurement result of the measured cell may be obtained by measuring a measurement reference signal.

The measurement reference signal may be a Synchronization Signal Block (SSB) or a Channel State Information Reference Signal (CSI-RS).

In some embodiments of the present disclosure, the first radio frequency measurement criterion may be one of at least one relaxed radio frequency measurement criterion, the at least one relaxed radio frequency measurement criterion being predefined, or configured by a network device; and/or the first measurement reporting criterion may be one of at least one restricted measurement reporting criterion, the at least one relaxed radio frequency measurement criterion being predefined, or configured by a network device.

The method embodiments of the present disclosure have been described in detail above with reference to FIG. 2 to FIG. 3, and the apparatus embodiments of the present disclosure will be described in detail below with reference to FIG. 4 to FIG. 7. It can be appreciated that the apparatus embodiments and the method embodiments correspond to each other, and for similar descriptions, reference can be made to the method embodiments.

FIG. 4 shows a schematic block diagram of a terminal device 400 according to an embodiment of the present disclosure. As shown in FIG. 4, the terminal device 300 includes:

- a processing unit 410 configured to relax a radio frequency measurement criterion and/or restrict cell measurement report content under a condition.

In some embodiments of the present disclosure, the processing unit 410 may be configured to:

- relax the radio frequency measurement criterion and/or restrict the cell measurement report content according to first instruction information, the first instruction information instructing the terminal device to relax the radio frequency measurement criterion and/or restrict the cell measurement report content.

In some embodiments of the present disclosure, the first instruction information may be carried by at least one of: a system broadcast message; or dedicated signaling.

In some embodiments of the present disclosure, the processing unit 410 may be further configured to:

relax the radio frequency measurement criterion and/or restrict the cell measurement report content according to a predetermined rule.

In some embodiments of the present disclosure, the predetermined rule may include at least one of:

- the terminal device supporting communication with a non-terrestrial cell, and the terminal device relaxing the radio frequency measurement criterion and/or restricting the cell measurement report content when a current serving cell of the terminal device is a non-terrestrial cell; or
- the terminal device being a specific type of terminal.

In some embodiments of the present disclosure, the operation of relaxing the radio frequency measurement criterion may include at least one of:

- relaxing a requirement on a minimum number of times the terminal device samples a radio frequency signal;
- relaxing a requirement on a minimum sampling time interval between consecutive sampling processes of a radio frequency signal performed by the terminal device;
- relaxing a requirement on a measurement accuracy of a radio frequency receiver of the terminal device; or
- relaxing a requirement on an algorithm complexity for the terminal device to combine a plurality of sampling results of a radio frequency signal.

In some embodiments of the present disclosure, the operation of restricting the cell measurement report content may include: restricting the cell measurement report content of a serving cell and/or restricting the cell measurement report content of at least one neighboring cell.

In some embodiments of the present disclosure, the operation of restricting the cell measurement report content may include at least one of:

- including at least a measurement result of a neighboring cell;
- including at least PCI information of a measured cell;

including at least an RSRP measurement result of a measured cell;

including at least an RSRQ measurement result of a measured cell;

including at least an SINR measurement result of a measured cell;

including at least index information of ephemeris data associated with a measured cell; or restricting a maximum number of cells for which measurement results can be reported.

In some embodiments of the present disclosure, the RSRP measurement result of the measured cell may be a cell-level measurement result of the measured cell or a beam-level measurement result of the measured cell; and/or the RSRQ measurement result of the measured cell may be a cell-level measurement result of the measured cell or a beam-level measurement result of the measured cell; and/or the SINR measurement result of the measured cell may be a cell-level measurement result of the measured cell or a beam-level measurement result of the measured cell.

In some embodiments of the present disclosure, the RSRP measurement result of the measured cell may be obtained by measuring a measurement reference signal; and/or the RSRQ measurement result of the measured cell may be obtained by measuring a measurement reference signal; and/or the SINR measurement result of the measured cell may be obtained by measuring a measurement reference signal.

The measurement reference signal may be a Synchronization Signal Block (SSB) or a Channel State Information Reference Signal (CSI-RS).

In some embodiments of the present disclosure, the radio frequency measurement criterion may include at least one measurement restriction condition, the first instruction information may include a plurality of first bits each corresponding to at least one measurement restriction condition, different values of each first bit indicating whether to relax the measurement restriction condition corresponding to the first bit; and/or the cell measurement report content may include at least one report item, the first instruction information may include a plurality of second bits each corresponding to at least one report item, different values of each second bit indicating whether to restrict reporting of the report item corresponding to the second bit.

Optionally, in some embodiments, the above processing unit may be one or more processors.

It can be appreciated that the terminal device 400 according to the embodiment of the present disclosure may correspond to the terminal device in the method embodiment of the present disclosure, and the above and other operations and/or functions of the respective units in the terminal device 400 are provided for the purpose of implementing the process flow corresponding to the terminal device in the method 200 shown in FIG. 2, and details thereof will be not omitted here for brevity.

FIG. 5 shows a schematic block diagram of a terminal device 500 according to an embodiment of the present disclosure. As shown in FIG. 5, the terminal device 500 includes:

a processing unit 510 configured to perform radio frequency signal measurement according to a first radio frequency measurement criterion, and/or perform cell measurement reporting according to a first measurement reporting criterion under a condition.

The first radio frequency measurement criterion is a relaxed radio frequency measurement criterion relative to a second radio frequency measurement criterion, and the first measurement reporting criterion is a restricted measurement reporting criterion relative to a second measurement reporting criterion.

In some embodiments of the present disclosure, the first radio frequency measurement criterion being the relaxed radio frequency measurement criterion relative to the second radio frequency measurement criterion may include:

a number of measurement restriction conditions included in the first radio frequency measurement criterion being smaller than a number of measurement restriction conditions included in the second radio frequency measurement criterion, and/or a parameter value of a measurement restriction condition included in the first radio frequency measurement criterion is smaller than a parameter value of a corresponding measurement restriction condition in the second radio frequency measurement criterion.

In some embodiments of the present disclosure, the measurement restriction condition may include at least one of:

a requirement on a minimum number of times of sampling a radio frequency signal;

a requirement on a minimum sampling time interval between consecutive sampling processes of a radio frequency signal;

a requirement on a measurement accuracy of a radio frequency receiver of the terminal device; or a requirement on an algorithm complexity of combining a plurality of sampling results of a radio frequency signal.

In some embodiments of the present disclosure, the processing unit 510 may be further configured to:

perform the radio frequency signal measurement according to the first radio frequency measurement criterion, and/or perform the cell measurement reporting according to the first measurement reporting criterion according to first instruction information, the first instruction information instructing the terminal device to perform the radio frequency signal measurement according to a relaxed radio frequency measurement criterion, and/or the first instruction information instructing the terminal device to perform the cell measurement reporting according to a restricted measurement reporting criterion.

In some embodiments of the present disclosure, the first instruction information may be carried by at least one of: a system broadcast message; or dedicated signaling.

In some embodiments of the present disclosure, the processing unit 510 may be further configured to:

perform the radio frequency signal measurement according to the first radio frequency measurement criterion, and/or perform the cell measurement reporting according to the first measurement reporting criterion according to a predetermined rule.

In some embodiments of the present disclosure, the predetermined rule may include at least one of:

the terminal device supporting communication with a non-terrestrial cell, and the terminal device relaxing the radio frequency measurement criterion and/or restricting the cell measurement report content when a current serving cell of the terminal device is a non-terrestrial cell; or the terminal device being a specific type of terminal.

In some embodiments of the present disclosure, the first measurement reporting criterion being the restricted measurement reporting criterion relative to the second measurement reporting criterion may include:

cell measurement report content required to be reported based on the first measurement reporting criterion being less than cell measurement report content required to be reported based on the second measurement reporting criterion.

In some embodiments of the present disclosure, the cell measurement report content reported based on the first measurement reporting criterion being less than the cell measurement report content reported based on the second measurement reporting criterion may include:

- measurement report content of a serving cell reported based on the first measurement reporting criterion being less than measurement report content of the serving cell reported based on the second measurement reporting criterion; and/or
- measurement report content of at least one neighboring cell reported based on the first measurement reporting criterion being less than measurement report content of the neighboring cell reported based on the second measurement reporting criterion.

In some embodiments of the present disclosure, the first measurement reporting criterion indicating that the cell measurement report content to be reported includes at least one of:

- including at least a measurement result of a neighboring cell;
- including at least PCI information of a measured cell;
- including at least an RSRP measurement result of a measured cell;
- including at least an RSRQ measurement result of a measured cell;
- including at least an SINR measurement result of a measured cell;
- including at least index information of ephemeris data associated with a measured cell; or
- restricting a maximum number of cells for which measurement results can be reported.

In some embodiments of the present disclosure, the RSRP measurement result of the measured cell may be a cell-level measurement result of the measured cell or a beam-level measurement result of the measured cell; and/or the RSRQ measurement result of the measured cell may be a cell-level measurement result of the measured cell or a beam-level measurement result of the measured cell; and/or the SINR measurement result of the measured cell may be a cell-level measurement result of the measured cell or a beam-level measurement result of the measured cell.

In some embodiments of the present disclosure, the RSRP measurement result of the measured cell may be obtained by measuring a measurement reference signal; and/or the RSRQ measurement result of the measured cell may be obtained by measuring a measurement reference signal; and/or the SINR measurement result of the measured cell may be obtained by measuring a measurement reference signal.

The measurement reference signal may be a Synchronization Signal Block (SSB) or a Channel State Information Reference Signal (CSI-RS).

In some embodiments of the present disclosure, the first radio frequency measurement criterion may be one of at least one relaxed radio frequency measurement criterion, the at least one relaxed radio frequency measurement criterion being predefined, or configured by a network device; and/or the first measurement reporting criterion may be one of at least one restricted measurement reporting criterion, the at least one restricted measurement reporting criterion being predefined, or configured by a network device.

Optionally, in some embodiments, the above processing unit may be one or more processors.

It can be appreciated that the terminal device 500 according to the embodiment of the present disclosure may correspond to the terminal device in the method embodiment of the present disclosure, and the above and other operations and/or functions of the respective units in the terminal device 500 are provided for the purpose of implementing the process flow corresponding to the terminal device in the method 300 shown in FIG. 3, and details thereof will be not omitted here for brevity.

Figure 6:
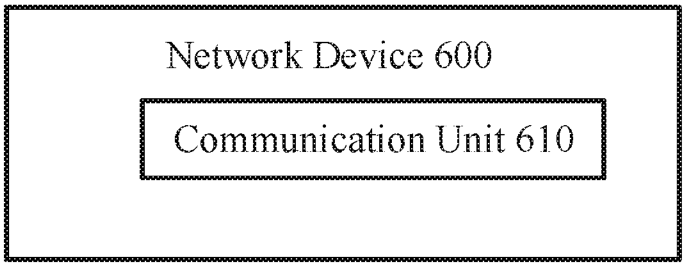
FIG. 6 is a schematic block diagram of a network device according to an embodiment of the present disclosure.

FIG. 6 shows a schematic block diagram of a network device according to an embodiment of the present disclosure. As shown in FIG. 6, the network device 800 includes:

a communication unit 610 configured to transmit first instruction information to a terminal device, the first instruction information instructing the terminal device to relax a radio frequency measurement criterion and/or restrict cell measurement report content, or the first instruction information instructing the terminal device to perform radio frequency signal measurement based on a relaxed radio frequency measurement criterion and/or report a cell measurement result based on a restricted measurement reporting criterion.

In some embodiments of the present disclosure, the first instruction information may be carried by at least one of: a system broadcast message; or dedicated signaling.

In some embodiments of the present disclosure, the operation of relaxing the radio frequency measurement criterion may include at least one of:

- relaxing a requirement on a minimum number of times the terminal device samples a radio frequency signal;
- relaxing a requirement on a minimum sampling time interval between consecutive sampling processes of a radio frequency signal performed by the terminal device;
- relaxing a requirement on a measurement accuracy of a radio frequency receiver of the terminal device; or
- relaxing a requirement on an algorithm complexity for the terminal device to combine a plurality of sampling results of a radio frequency signal.

In some embodiments of the present disclosure, the operation of restricting the cell measurement report content may include: restricting the cell measurement report content of a serving cell and/or restricting the cell measurement report content of at least one neighboring cell.

In some embodiments of the present disclosure, the operation of restricting the cell measurement report content may include at least one of:

- including at least a measurement result of a neighboring cell;
- including at least PCI information of a measured cell;
- including at least an RSRP measurement result of a measured cell;
- including at least an RSRQ measurement result of a measured cell;
- including at least an SINR measurement result of a measured cell;
- including at least index information of ephemeris data associated with a measured cell; or
- restricting a maximum number of cells for which measurement results can be reported.

In some embodiments of the present disclosure, the RSRP measurement result of the measured cell may be a cell-level measurement result of the measured cell or a beam-level measurement result of the measured cell; and/or the RSRQ measurement result of the measured cell may be a cell-level measurement result of the measured cell or a beam-level measurement result of the measured cell; and/or the SINR measurement result of the measured cell may be a cell-level measurement result of the measured cell or a beam-level measurement result of the measured cell.

In some embodiments of the present disclosure, the RSRP measurement result of the measured cell may be obtained by measuring a measurement reference signal; and/or the RSRQ measurement result of the measured cell may be obtained by measuring a measurement reference signal; and/or the SINR measurement result of the measured cell may be obtained by measuring a measurement reference signal.

The measurement reference signal may be a Synchronization Signal Block (SSB) or a Channel State Information Reference Signal (CSI-RS).

In some embodiments of the present disclosure, the radio frequency measurement criterion may include at least one measurement restriction condition, the first instruction information may include a plurality of first bits each corresponding to at least one measurement restriction condition, different values of each first bit indicating whether to relax the measurement restriction condition corresponding to the first bit; and/or the cell measurement report content may include at least one report item, the first instruction information may include a plurality of second bits each corresponding to at least one report item, different values of each second bit indicating whether to restrict reporting of the report item corresponding to the second bit.

In some embodiments of the present disclosure, the relaxed radio frequency measurement criterion may include at least one radio frequency measurement criterion, they at least one measurement reporting criterion being predefined, or configured by the network device; and/or the restricted measurement reporting criterion may include at least one measurement reporting criterion, the at least one measurement reporting criterion being predefined, or configured by the network device.

Optionally, in some embodiments, the above communication unit may be a communication interface or a transceiver, or an input/output interface of a communication chip or a system-on-chip.

It can be appreciated that the network device 600 according to the embodiment of the present disclosure may correspond to the network device in the method embodiment of the present disclosure, and the above and other operations and/or functions of the respective units in the network device 600 are provided for the purpose of implementing the process flow corresponding to the network device in the method shown in FIG. 2 or FIG. 3, and details thereof will be not omitted here for brevity.

Figure 7:
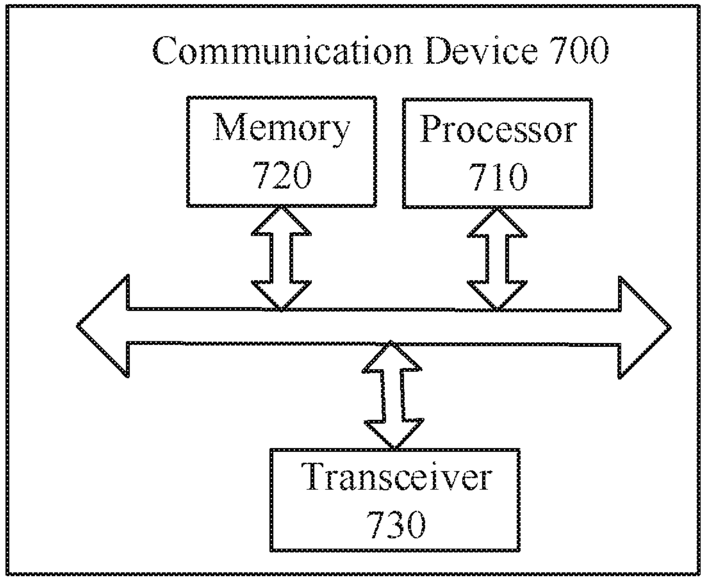
FIG. 7 is a schematic block diagram of a communication device according to an embodiment of the present disclosure.

FIG. 7 is a schematic diagram showing a structure of a communication device 700 according to an embodiment of the present disclosure. The communication device 700 shown in FIG. 7 includes a processor 710, and the processor 710 is configured to invoke and execute a computer program from a memory to implement the method according to any one of embodiments of the present disclosure.

Optionally, as shown in FIG. 7, the communication device 700 may further include a memory 720. The processor 710 may invoke and run a computer program from the memory 720 to implement the method according to any one of embodiments of the present disclosure.

The memory 720 may be a separate component independent of the processor 710, or may be integrated in the processor 710.

Optionally, as shown in FIG. 7, the communication device 700 may further include a transceiver 730, and the processor 710 may control the transceiver 730 to communicate with other devices, and in particular, to transmit information or data to other devices, or receive information or data transmitted by other devices.

Here, the transceiver 730 may include a transmitter and a receiver. The transceiver 730 may further include one or more antennas.

Optionally, the communication device 700 may specifically be a network device according to the embodiment of the present disclosure, and the communication device 700 may execute corresponding processes implemented by the network device in the method according to any one of the embodiments of the present disclosure. For the sake of brevity, details thereof will be omitted here.

Optionally, the communication device 700 may specifically be the mobile terminal/terminal device according to any one of the embodiment of the present disclosure, and the communication device 700 may implement the corresponding processes implemented by the terminal device in the method according to any one of the embodiments of the present disclosure. For the sake of brevity, details thereof will be omitted here.

Figure 8:
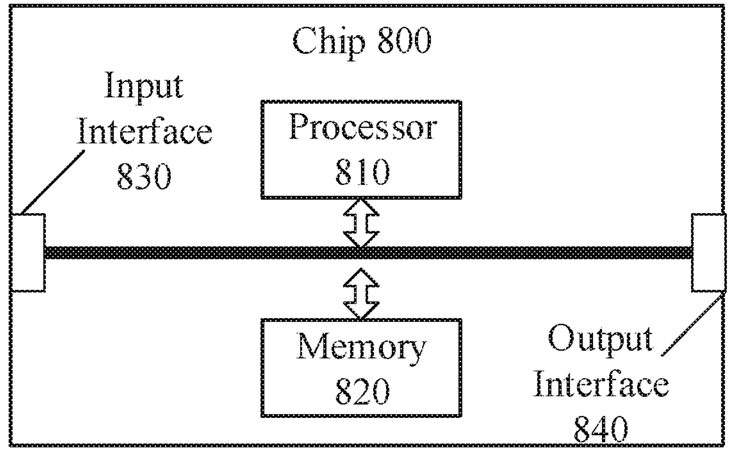
FIG. 8 is a schematic block diagram of a chip according to an embodiment of the present disclosure.

FIG. 8 is a schematic structural diagram showing a chip according to an embodiment of the present disclosure. The chip 800 shown in FIG. 8 includes a processor 810, and the processor 810 may invoke and execute a computer program from a memory to implement the method according to any one of embodiments of the present disclosure.

Optionally, as shown in FIG. 8, the chip 800 may further include a memory 820. The processor 810 may invoke and execute a computer program from the memory 820 to implement the method according to any one of embodiments of the present disclosure.

The memory 820 may be a separate device independent from the processor 810, or may be integrated in the processor 810.

Optionally, the chip 800 may further include an input interface 830. The processor 810 may control the input interface 830 to communicate with other devices or chips, and in particular, to obtain information or data transmitted by other devices or chips.

Optionally, the chip 800 may further include an output interface 840. The processor 810 can control the output interface 840 to communicate with other devices or chips, and in particular, to output information or data to other devices or chips.

Optionally, the chip can be applied to the network device according to any one of the embodiments of the present disclosure, and the chip can implement the corresponding processes implemented by the network device in the method according to any one of the embodiments of the present disclosure. For the sake of brevity, details thereof will be omitted here.

Optionally, the chip can be applied to the mobile terminal/terminal device according to the embodiments of the present disclosure, and the chip can implement the corresponding processes implemented by the mobile terminal/terminal device in the method according to any one of the embodiments of the present disclosure. For the sake of brevity, details thereof will be omitted here.

It can be appreciated that the chip in the embodiment of the present disclosure may also be referred to as a system-level chip, a system-chip, a chip system, or a system-on-chip.

Figure 9:
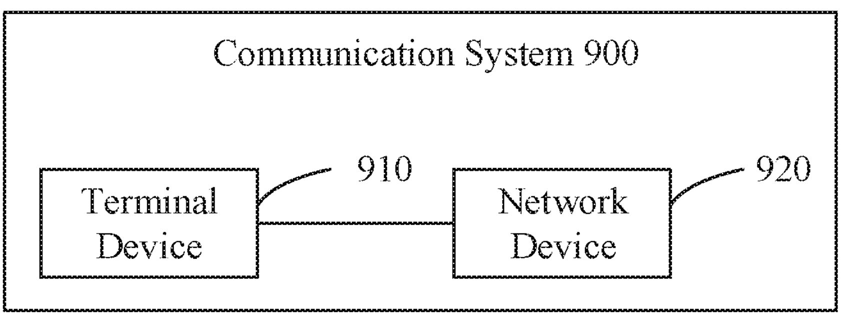
FIG. 9 is a schematic block diagram of a communication system according to an embodiment of the present disclosure.

FIG. 9 is a schematic block diagram showing a communication system 900 according to an embodiment of the present disclosure. As shown in FIG. 9, the communication system 900 includes a terminal device 910 and a network device 920.

Here, the terminal device 910 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, actions of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The method, actions, and logical block diagrams disclosed in the embodiments of the present disclosure can be implemented or performed. The general purpose processor may be a microprocessor or any conventional processor. The actions of the method disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the actions of the above method in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the actions of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A terminal device, comprising: a processor and a memory, wherein the memory is configured to store a computer program, and the processor is configured to invoke and execute the computer program stored in the memory, to cause the terminal device to perform:

relaxing a radio frequency measurement criterion under a condition and/or restricting cell measurement report content under the condition;

wherein said relaxing the radio frequency measurement criterion comprises at least one of:

relaxing a requirement on a minimum number of times the terminal device samples a radio frequency signal;

relaxing a requirement on a minimum sampling time interval between consecutive sampling processes of a radio frequency signal performed by the terminal device;

relaxing a requirement on a measurement accuracy of a radio frequency receiver of the terminal device; or relaxing a requirement on an algorithm complexity of combining, by the terminal device, a plurality of sampling results of a radio frequency signal;

wherein said restricting the cell measurement report content comprises at least one of:

comprising at least a measurement result of a neighboring cell;

comprising at least Physical Cell Identifier (PCI) information of a measured cell;

comprising at least a Reference Signal Received Power (RSRP) measurement result of a measured cell;

comprising at least a Reference Signal Received Quality (RSRQ) measurement result of a measured cell;

comprising at least a Signal to Interference plus Noise Ratio (SINR) measurement result of a measured cell;

comprising at least index information of ephemeris data associated with a measured cell; or restricting a maximum number of cells for which measurement results can be reported.

2. The terminal device according to claim 1, wherein the processor is configured to invoke the computer program stored in the memory and execute the computer program, to cause the terminal device further to perform:

relaxing the radio frequency measurement criterion and/or restricting the cell measurement report content according to first instruction information, the first instruction information instructing the terminal device to relax the radio frequency measurement criterion and/or restrict the cell measurement report content.

3. The terminal device according to claim 2, wherein the radio frequency measurement criterion comprises at least one measurement restriction condition, the first instruction information comprises a plurality of first bits each corresponding to at least one measurement restriction condition, different values of each first bit indicating whether to relax the measurement restriction condition corresponding to the first bit; and/or the cell measurement report content comprises at least one report item, the first instruction information comprises a plurality of second bits each corresponding to at least one report item, different values of each second bit indicating whether to restrict reporting of the report item corresponding to the second bit.

4. The terminal device according to claim 1, wherein the processor is configured to invoke the computer program stored in the memory and execute the computer program, to cause the terminal device further to perform:

relaxing the radio frequency measurement criterion and/or restricting the cell measurement report content according to a predetermined rule;

wherein the predetermined rule comprises at least one of:

the terminal device supporting communication with a non-terrestrial cell, and the terminal device relaxing the radio frequency measurement criterion and/or restricting the cell measurement report content when a current serving cell of the terminal device is a non-terrestrial cell; or the terminal device being a specific type of terminal.

5. A network device, comprising a processor and a memory, wherein the memory is configured to store a computer program, and the processor is configured to invoke and execute the computer program stored in the memory, to cause the network device to perform:

transmitting first instruction information to a terminal device, wherein the first instruction information instructs the terminal device to relax a radio frequency measurement criterion and/or restrict cell measurement report content, or the first instruction information instructs the terminal device to perform radio frequency signal measurement based on a relaxed radio frequency measurement criterion and/or report a cell measurement result based on a restricted measurement reporting criterion;

wherein said relaxing the radio frequency measurement criterion comprises at least one of:

relaxing a requirement on a minimum number of times the terminal device samples a radio frequency signal;

relaxing a requirement on a minimum sampling time interval between consecutive sampling processes of a radio frequency signal performed by the terminal device;

relaxing a requirement on a measurement accuracy of a radio frequency receiver of the terminal device; or relaxing a requirement on an algorithm complexity of combining, by the terminal device, a plurality of sampling results of a radio frequency signal;

wherein restricting the cell measurement report content comprises at least one of:

comprising at least a measurement result of a neighboring cell;

comprising at least Physical Cell Identifier (PCI) information of a measured cell;

comprising at least a Reference Signal Received Power (RSRP) measurement result of a measured cell;

comprising at least a Reference Signal Received Quality (RSRQ) measurement result of a measured cell;

comprising at least a Signal to Interference plus Noise Ratio (SINR) measurement result of a measured cell;

comprising at least index information of ephemeris data associated with a measured cell; or restricting a maximum number of cells for which measurement results can be reported.

6. The network device according to claim 5, wherein the radio frequency measurement criterion comprises at least one measurement restriction condition, the first instruction information comprises a plurality of first bits each corresponding to at least one measurement restriction condition, different values of each first bit indicating whether to relax the measurement restriction condition corresponding to the first bit; and/or the cell measurement report content comprises at least one report item, the first instruction information comprises a plurality of second bits each corresponding to at least one report item, different values of each second bit indicating whether to restrict reporting of the report item corresponding to the second bit.

7. The network device according to claim 5, wherein the relaxed radio frequency measurement criterion comprises at least one radio frequency measurement criterion, the at least one radio frequency measurement criterion being predefined, or configured by the network device; and/or the restricted measurement reporting criterion comprises at least one measurement reporting criterion, the at least one measurement reporting criterion being predefined, or configured by the network device.

8. A measurement method, comprising:

relaxing, by a terminal device, a radio frequency measurement criterion under a condition, and/or restricting, by the terminal device, cell measurement report content under the condition;

wherein said relaxing the radio frequency measurement criterion comprises at least one of:

relaxing a requirement on a minimum number of times the terminal device samples a radio frequency signal;

relaxing a requirement on a minimum sampling time interval between consecutive sampling processes of a radio frequency signal performed by the terminal device;

relaxing a requirement on a measurement accuracy of a radio frequency receiver of the terminal device; or relaxing a requirement on an algorithm complexity of combining, by the terminal device, a plurality of sampling results of a radio frequency signal;

wherein said restricting the cell measurement report content comprises at least one of:

comprising at least a measurement result of a neighboring cell;

comprising at least Physical Cell Identifier (PCI) information of a measured cell;

comprising at least a Reference Signal Received Power (RSRP) measurement result of a measured cell;

comprising at least a Reference Signal Received Quality (RSRQ) measurement result of a measured cell;

comprising at least a Signal to Interference plus Noise Ratio (SINR) measurement result of a measured cell;

comprising at least index information of ephemeris data associated with a measured cell; or restricting a maximum number of cells for which measurement results can be reported.

9. The method according to claim 8, wherein said relaxing, by the terminal device, the radio frequency measurement criterion under the condition, and/or restricting, by the terminal device, the cell measurement report content under the condition comprises:

relaxing, by the terminal device the radio frequency measurement criterion according to first instruction information, and/or restricting, by the terminal device, the cell measurement report content according to the first instruction information, wherein the first instruction information instructs the terminal device to relax the radio frequency measurement criterion, and/or the first instruction information instructs the terminal device to restrict the cell measurement report content.

10. The terminal device according to claim 9, wherein the radio frequency measurement criterion comprises at least one measurement restriction condition, the first instruction information comprises a plurality of first bits each corresponding to at least one measurement restriction condition, different values of each first bit indicating whether to relax the measurement restriction condition corresponding to the first bit; and/or the cell measurement report content comprises at least one report item, the first instruction information comprises a plurality of second bits each corresponding to at least one report item, different values of each second bit indicating whether to restrict reporting of the report item corresponding to the second bit.

11. The method according to claim 8, wherein said relaxing, by the terminal device, the radio frequency measurement criterion under the condition, and/or restricting, by the terminal device, the cell measurement report content under the condition comprises:

relaxing, by the terminal device, the radio frequency measurement criterion according to a predetermined rule, and/or restricting, by the terminal device, the cell measurement report content according to the predetermined rule.

12. The method according to claim 11, wherein the predetermined rule comprises at least one of:

the terminal device supporting communication with a non-terrestrial cell, and the terminal device relaxing the radio frequency measurement criterion and/or restricting the cell measurement report content when a current serving cell of the terminal device is a non-terrestrial cell; or the terminal device being a specific type of terminal.

* * * * *